(12) United States Patent
Andersen et al.

(10) Patent No.: US 12,411,579 B2
(45) Date of Patent: Sep. 9, 2025

(54) TOUCH-ORIGINATING SOUND PROFILE SENSING SYSTEMS AND METHODS

(71) Applicant: Bang & Olufsen A/S, Struer (DK)

(72) Inventors: Kevin Nørby Andersen, Kgs. Lyngby (DK); Pablo Martinez-Nuevo, Kgs. Lyngby (DK); Miklu Silvanto, Kgs. Lyngby (DK)

(73) Assignee: Bang & Olufsen A/S, Struer (DK)

( * ) Notice: Subject to any disclaimer, the term of this patent is extended or adjusted under 35 U.S.C. 154(b) by 0 days.

(21) Appl. No.: 18/479,525

(22) Filed: Oct. 2, 2023

(65) Prior Publication Data

US 2024/0111384 A1 Apr. 4, 2024

Related U.S. Application Data

(60) Provisional application No. 63/377,884, filed on Sep. 30, 2022.

(51) Int. Cl.
*G06F 3/043* (2006.01)
*G06F 3/041* (2006.01)

(52) U.S. Cl.
CPC ............ *G06F 3/043* (2013.01); *G06F 3/0416* (2013.01)

(58) Field of Classification Search
CPC ............................ G06F 3/043; G06F 3/0416
See application file for complete search history.

(56) References Cited

U.S. PATENT DOCUMENTS

| | | | |
|---|---|---|---|
| 7,411,581 B2 * | 8/2008 | Hardie-Bick | G06F 3/0433 178/18.01 |
| 8,519,982 B2 | 8/2013 | Camp, Jr. et al. | |
| 8,854,339 B2 | 10/2014 | Kent et al. | |
| 9,851,848 B2 | 12/2017 | Pellikka et al. | |
| 10,241,583 B2 * | 3/2019 | Lopez Meyer | G06F 3/043 |
| 11,327,599 B2 | 5/2022 | Sheng et al. | |
| 11,347,355 B2 | 5/2022 | Khajeh et al. | |
| 11,402,950 B2 | 8/2022 | Khajeh et al. | |
| 11,592,423 B2 * | 2/2023 | Munemoto | G01N 29/12 |
| 2005/0083313 A1 | 4/2005 | Hardie-Bick | |
| 2015/0035759 A1 | 2/2015 | Harrison et al. | |
| 2018/0059797 A1 * | 3/2018 | Lopez Meyer | G06F 3/017 |
| 2020/0118558 A1 * | 4/2020 | Wightman | G10L 15/10 |

OTHER PUBLICATIONS

Extended European Search Report dated Feb. 23, 2024 for Application No. 23200535.5, 9 pages.

\* cited by examiner

*Primary Examiner* — Peter D McLoone
(74) *Attorney, Agent, or Firm* — Patterson + Sheridan, LLP

(57) ABSTRACT

A device-agnostic system for detecting one or more sound profiles, each of the one or more sound profiles including at least one spectrogram produced from sound associated with a touch input and mapped to a control operation for a device, the system including a transducer and a processor. The transducer can detect a sound produced from touching a surface and produce an electrical signal from the detected sound. The processor is configured to receive the electrical signal from the transducer, convert the received electrical signal to a spectrogram, determine, using image recognition, that the spectrogram meets or surpasses a similarity threshold to one of the one or more sound profiles, and change at least one characteristic of the device based on the control operation mapped to the determined sound profile.

20 Claims, 5 Drawing Sheets

TOUCH-ORIGINATING SOUND PROFILE SENSING SYSTEMS AND METHODS

PRIORITY CLAIM

The present application claims priority from U.S. Provisional Patent Application No. 63/377,884, filed Sep. 30, 2022, which is hereby fully incorporated herein by reference.

TECHNICAL FIELD

Embodiments of the present disclosure relate generally to the field of acoustic sensing. In particular, the present disclosure relates to systems and methods for recognition of sound profiles produced by touch input, which can then be used to control a device.

BACKGROUND

There are a wide variety of devices for capturing user input, including buttons, sliders keyboards, mice, touch screens, and the like. These devices generally allow a user to provide inputs to perform various operations and are often used in conjunction with a user interface (UI). Accordingly, these devices generally require a user to interact directly with the device or to maintain line of sight with a display device.

Touch screens generally combine the functionality of input devices and display devices. Conventionally, touch screens use capacitive and resistive touch detection technology to register input. To employ capacitive touch technology, a glass panel is typically coated with material that can hold an electrical charge sensitive to a human finger/skin or a stylus or similar device. By detecting the change in the electrical charge resulting from a touch, a touch location can be detected. In some capacitive-type touch sensing systems, fringing electrical fields used to detect touch can extend beyond the surface of the display, and objects approaching near the surface may be detected without actually touching the surface. However, such capacitive-type touch systems generally experience reduced performance due to conductive, electrically-floating objects, such as water droplets, in contact with the touch-sensitive surface. To employ resistive touch technology, a glass panel is often coated with multiple conductive layers that register input based on contact of the conductive layers when physical pressure is applied to the panel. Drawbacks of resistive touch technology include inability to support multi-touch gestures, poor visibility in direct sunlight, cost, and lesser durability.

Additional types of touch detection technology include acoustic pulse recognition and surface acoustic wave technology. Acoustic pulse recognition systems incorporate transducers attached to the edges of a touchscreen glass that register the sound emitted on the glass due to a touch. One known issue with such systems is that the surface glass may pick up other external sounds and vibrations that can reduce the accuracy and effectiveness of the system. Surface acoustic wave technology functions by sending ultrasonic waves in a guided pattern to detect a touch on the touch screen using reflectors. Implementing such a guided pattern of ultrasonic waves can be costly and difficult. Furthermore, detecting particular input types, such as multi-touch inputs, may be difficult or even impossible using these input methods.

Ultimately, conventional methods of touch input generally rely on a user interacting with a particular surface or touch screen communicatively coupled to a system or device. These touch detection technologies often require a substantial surface area specifically configured to be interactive that can be impractical for small devices, such as earbuds. Additionally, touch screens can substantially increase the cost of producing devices, particularly when incorporating relatively complex approaches such as surface acoustic wave technology.

SUMMARY

A need exists, therefore, for systems and methods of detecting touch input that are not reliant on an active surface.

In one aspect, the present disclosure provides for a device-agnostic system for detecting one or more sound profiles, each of the one or more sound profiles including at least one spectrogram produced from sound associated with a touch input and mapped to a control operation for a device, includes at least one transducer and at least one processor. The at least one transducer can detect a sound produced from touching a surface and produce an electrical signal from the detected sound. The at least one processor is configured to receive the electrical signal from the at least one transducer, convert the received electrical signal to a spectrogram, determine, using image recognition, that the spectrogram meets or surpasses a similarity threshold to one of the one or more sound profiles, and change at least one characteristic of the device based on the control operation mapped to the determined sound profile.

In embodiments, the at least one transducer is disposed in or proximate to a listening device having a housing including one or more active surfaces and one or more inactive surfaces as defined herein, wherein the inactive surfaces have no capacitive or pressure sensing capability. In some embodiments, the one or more inactive surfaces are located on the exterior of the housing and be engraved, logoed, or textured and the determining can be based in part on the one or more inactive surfaces. In embodiments, a position of the at least one transducer relative to the housing is known and the determining is based in part on the position.

In embodiments, the determining is based in part on one or more device characteristics of the listening device.

The at least one transducer can be configured to detect the sound only upon receiving an active listening command according to embodiments.

In embodiments, the determining is based on one or more of a touchdown stage representing a user making contact with the surface during the touch input, a movement stage representing the user continuing contact with the surface during the touch input, and a liftoff stage representing the user ceasing contact with the surface during the touch input. The determining can also be based in part on whether a preceding spectrogram from a previous detected sound failed to meet or surpasses the similarity threshold with all of the one or more sound profiles.

In embodiments, the at least one processor is further configured to update the determined sound profile to include the spectrogram.

In a second aspect, the present disclosure provides for a device-agnostic method for detecting one or more sound profiles, each of the one or more sound profiles including at least one spectrogram produced from sound associated with a touch input and mapped to a control operation for a device. The method includes detecting a sound produced from touching a surface, producing an electrical signal from the detected sound, and transmitting the electrical signal to a processor. The method further includes, at the processor, converting, the received electrical signal to a spectrogram, determining, using image recognition, that the spectrogram meets or surpasses a similarity threshold to one of the one or more sound profiles, and changing at least one characteristic of the device based on the control operation mapped to the determined sound profile.

In embodiments, the surface is a portion of an inactive housing of a listening device, the inactive housing having no capacitive or pressure sensing surfaces. The surface can be an exterior face of the inactive housing that is engraved, logoed, or textured.

In embodiments, the determining can be based in part on the type or texture of the surface. The determining can further be based in part on a type of listening device.

In embodiments the method further includes receiving an active listening command prior to detecting the sound.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

Figure 1:
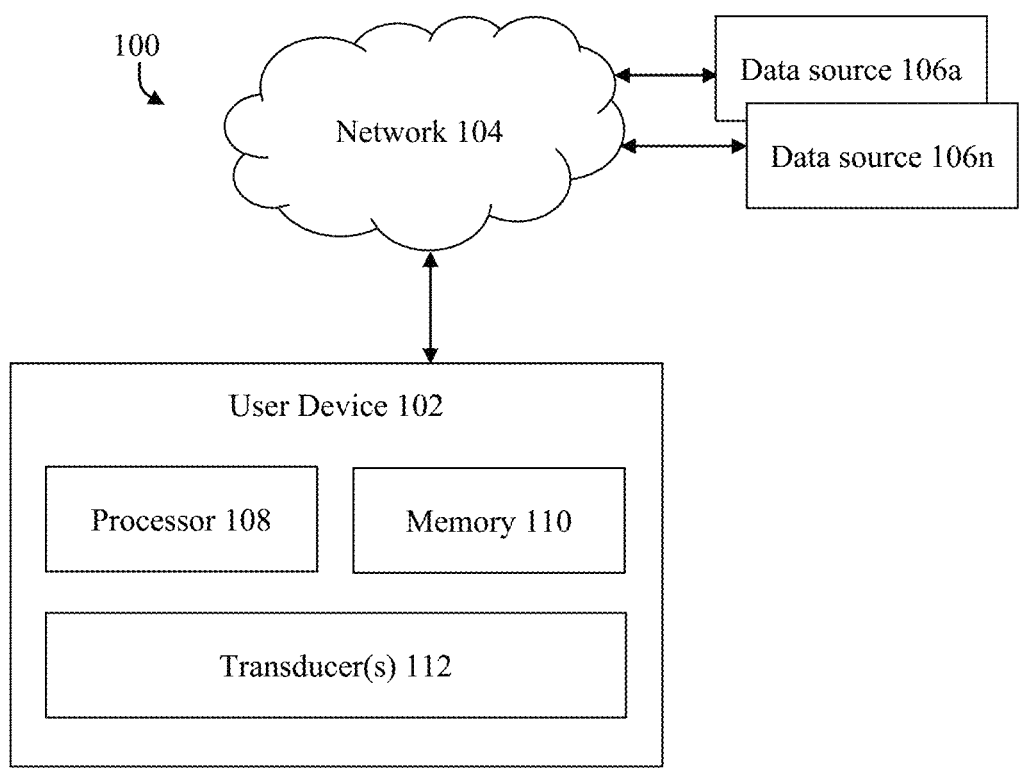
FIG. 1 is a block diagram of a system for processing touch input using sound, according to an embodiment.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION

The present disclosure is directed to systems and methods for recognizing sound generated by touch input, which then can be used to control a device. This is accomplished by applying image recognition to match a spectrogram of detected sound to a sound profile associated with a particular touch input or type of touch input. In embodiments, the matching process can be accomplished by applying a machine learning algorithm (MLA) to the image recognition process.

Embodiments of the present disclosure are operable to detect and classify sound profiles associated with touch inputs without relying on conventional means of touch detection such as capacitive touch detection, resistive touch detection, acoustic pulse recognition and surface acoustic wave technology. Accordingly, the present disclosure is operable for use with inactive surfaces or device housings. As used herein, the term "active" is defined as a surface configured to detect human touch and the term "inactive" is defined as a surface that is not capacitive, pressure sensitive, or otherwise arranged to detect touch through delivery of a signal.

Referring to FIG. 1, a block diagram of a system 100 for receiving and processing touch input using sound is depicted, according to an embodiment. System 100 can be used to receive user inputs for one or more devices and generally comprises a user device 102, a network 104, and at least one data source 106.

User device 102 generally comprises a processor 108, memory 110, and at least one transducer 112. Examples of user device 102 include speakers, headphones, earbuds, smartphones, tablets, laptop computers, wearable devices, other consumer electronic devices or user equipment (UE), and the like. The term "user device" will be used herein throughout for convenience but is not limiting with respect to the actual features, characteristics, or composition of the or any device that could embody user device 102.

User device 102 can comprise a housing including one or both of active surfaces and inactive surfaces. Notably, detection and classification of sound profiles associated with touch inputs of the present disclosure can be accomplished irrespective of the housing of user device 102. That is, the housing of user device 102 can be entirely inactive. The housing of the user device 102 can also be a combination of active and inactive surfaces. Accordingly, one benefit realized by embodiments of the present disclosure is structural and/or material freedom with respect to at least the housing of user device 102. Because sound profiles do not rely on capacitance or delivery of signals, metal and other materials that might introduce interference with capacitance can be incorporated into the housing of the user device. Additional benefits of incorporating inactive surfaces for touch recognition include system simplification, and cost reduction. Use of inactive surfaces to expand the ways users can control and interact with existing products presents dramatic cost savings over alternatives such as retrofitting active surfaces to existing products. Embodiments of the present disclosure can leverage existing transducers 112 without any additional reconfiguration.

Processor 108 can be any programmable device that accepts digital data as input, is configured to process the input according to instructions or algorithms, and provides results as outputs. In an embodiment, processor 108 can be a central processing unit (CPU) or a microcontroller or microprocessor configured to carry out the instructions of a computer program. Processor 108 is therefore configured to perform at least basic arithmetical, logical, and input/output operations.

Memory 110 can comprise volatile or non-volatile memory as required by the coupled processor 108 to not only provide space to execute the instructions or algorithms, but to provide the space to store the instructions themselves. In embodiments, volatile memory can include random access memory (RAM), dynamic random access memory (DRAM), or static random access memory (SRAM), for example. In embodiments, non-volatile memory can include read-only memory, flash memory, ferroelectric RAM, hard disk, or optical disc storage, for example. The foregoing lists in no way limit the type of memory that can be used, as these embodiments are given only by way of example and are not intended to limit the scope of the present disclosure.

Transducer 112 refers to any device capable of sensing, detecting, or recording sound to produce an electrical signal. Transducer 112 can be a cardioid, omnidirectional, or bi-directional microphone. In embodiments, transducer 112 can be a single microphone or a microphone array comprising a plurality of microphones. In some embodiments, transducer 112 can be a piezoelectric transducer. In still other embodiments, transducer 112 can combine other types of acoustic sensors or a combination of sensors or devices that together can sense sound, pressure, or other characteristics related to audible or inaudible (with respect to the sensitivity of human hearing) sound produced from touch on a surface. Such inaudible sound can include ultrasound. Transducer 112 can be configured to record and store digital sound or data derived from captured sound. Any signals produced by transducer 112 can be transmitted to processor 108 for analysis.

System 100 can be implemented irrespective of the number or type of transducer 112, although it can be beneficial in some embodiments to have transducer 112 arranged at a known position relative to the housing or a portion of the housing. In embodiments, transducer 112 can be within or outside of an active housing or stored in a housing independent of the user device for which control operations are desired. For example, transducer 112 may be located within an earbud case and configured to estimate a sound profile from a user providing a touch input to the earbud case in order to control a proximate but physically decoupled pair of earbuds. The position of transducer 112 relative to the housing can enable more accurate sound profiles across devices as differences in perceived sound from the device arrangement can be mitigated or otherwise reduced. In embodiments, transducer 112 can be configured to detect sound frequencies ranging from 20 Hz to 100 kHz. In embodiments, transducer 112 can be configured to detect sound frequencies ranging from 20 Hz to 20 kHz. In embodiments, transducer 112 can be configured to detect ultrasonic frequencies ranging from 20 kHz to 100 kHz. In embodiments, the detected frequencies can span the audible range and ultrasound range and can be much larger.

User device 102 can include other features, devices, and subsystems, such as an input/output engine or sound processing engine, which comprise various engines or tools, each of which is constructed, programmed, configured, or otherwise adapted, to autonomously carry out a function or set of functions. The term "engine" as used herein is defined as a real-world device, component, or arrangement of components implemented using hardware, such as by an application specific integrated circuit (ASIC) or field-programmable gate array (FPGA), for example, or as a combination of hardware and software, such as by a microprocessor system and a set of program instructions that adapt the engine to implement the particular functionality, which (while being executed) transform the microprocessor system into a special-purpose device. An engine can also be implemented as a combination of the two, with certain functions facilitated by hardware alone, and other functions facilitated by a combination of hardware and software. In certain implementations, at least a portion, and in some cases, all, of an engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, some or all of the functionality of processor 108 can be carried out in a variety of physically realizable configurations across engines and should not be limited to any particular implementation exemplified herein, unless such limitations are expressly called out.

User device 102 is configured to provide two-way data communication with network 104 via a wired or wireless connection. The specific design and implementation of an input/output engine of processor 108 can depend on the communications network(s) over which user device 102 is intended to operate. User device 102 can, via network 104, access stored data from at least one data source 106.

Data source 106 can be a general-purpose database management storage system (DBMS) or relational DBMS as implemented by, for example, Oracle, IBM DB2, Microsoft SQL Server, PostgreSQL, MySQL, SQLite, Linux, or Unix solutions that is trained to interpret spectrograms corresponding to sound profiles of touch input. Data source 106 can store one or more training data sets configured to facilitate future image recognition of sound profiles within spectrograms of captured sound. In embodiments, data source 106 can sort or implement training data sets based on detected stages of a sound profile, such as touchdown, movement, and liftoff, of a touch input. In embodiments, data source 106 can be native to user device 102 such that no connection to network 104 is necessary.

One purpose of data source 106 is to store a plurality of spectrograms that are a visual way of representing the signal strength, or "loudness," of a signal over time at various frequencies present in a particular waveform. Spectrograms provide visual representations of the presence of more or less energy and how energy levels vary over time. These visual representations can be an effective way to compare and analyze detected sounds. Spectrograms can be depicted as a heat map, i.e., as an image with the intensity shown by varying the color or brightness.

Spectrograms can be produced from users touching a surface. User touches can be made in identifiable patterns or touch inputs (e.g., "swipe," "double-tap," "circle") that produce distinct sounds. These sounds can then be converted to spectrograms and saved within sound profiles that are associated with the particular touch input. Variances in detected sound within a particular sound profile, such as those due to different surface materials and distance between a transducer and a surface, can be learned across robust sample sizes.

The inventors of the present disclosure have recognized that touch inputs generally have similar energy levels over time. For example, in general lateral "swipe" touches on a surface produce sounds that when converted into spectrograms have common visual characteristics. In embodiments, artificial intelligence (AI) or a MLA can be trained to identify spectrograms of touch inputs by conducting image recognition for these visual characteristics.

Visual characteristics of spectrograms associated with specific touch inputs can be extracted manually or automatically by machine learning approaches such as, for example, neural networks, to produce spectrograms for sound profiles. The sound profiles, which each contain a series of visual characteristics associated with a particular touch input, can then be stored in data source 106 for future image recognition comparisons with spectrograms of detected sound. Such comparisons can be accomplished by computing similarity metrics using correlation or machine learning regression algorithms. For example, if the similarity of a spectrogram to a sound profile is above a certain threshold, (e.g., 75%, 90%, 95% or 99% similarity) the matching process can determine that the spectrogram represents to a touch input associated with the sound profile.

In embodiments the MLA can extract visual characteristics from particular portions of the spectrogram to better compare phases of touch inputs. For example, touch inputs can be separated into three distinct stages of touching a surface, touchdown, movement, and liftoff, and each of these phases can be individually compared to trained sound profiles using image recognition. Compartmentalizing the image recognition analysis can improve accuracy in some circumstances by limiting the influence of outlying data (e.g., a user's finger inadvertently slipping during a movement phase).

MLA techniques can be applied to labelled (supervised) or unlabeled (unsupervised) spectrogram data. Further, a classifier can take in parameters such as type of device (a speaker and headphones may have different parameters or sound detection capabilities for example) and type of surface the touch input is generated from. Reasons for employing such a classifier include identifying the position of a transducer relative to the housing of the user device or the number of transducers present.

In operation, the produced electric signal or spectrogram can be processed by the MLA to benefit from contextual information for the detected sound. In other words, the MLA can allow for processing of variable length inputs and outputs by maintaining state information over time. In one example, a user may repeat a touch input if a sound profile was not detected on a prior attempt. The MLA can consider the previous attempt and accordingly alter subsequent analysis of the second spectrogram, such as reducing a threshold needed to consider a particular sound profile matched. Similarly, if multiple spectrograms are being produced over a short window of time, commonalities such as heightened background noise can be identified and accounted for during the session. Thus, the context surrounding a detected sound can contribute to personalized AI insights that accounts for wide variation in execution of touch inputs across users.

The MLA can be trained to identify instances where the produced spectrogram includes excess time before or after a touch input. In embodiments, training data can include a plurality of spectrograms having touch inputs occurring at different time periods within the spectrogram. With sufficient training from such examples the MLA can better recognize when observed frequencies in a spectrogram may belong to background noise. This analysis can be improved during operation by inclusion of feedback loops directed to time-to-completion of touch inputs. As more comparisons between spectrograms and sound profiles are made, time-to-completion data (i.e., total time between touchdown, movement, and liftoff phases) can be tracked to better recognize the starting and ending points of the associated touch input.

In some embodiments, training data from particular textured or three-dimensionally featured surfaces can be used to improve sound profile recognition of the MLA. Textured surfaces can include one or more of engraved, etched, and logoed portions. Spectrograms generated from touch inputs on such textured surfaces can provide more identifiable patterns due to irregular contact. These patterns can effectively serve as calibration elements for the MLA in some embodiments. For example, the MLA can distinguish visual characteristics associated with swiping a surface from different directions if a known, nonsymmetrical texture has been applied to the surface. Sound profiles associated with each directional swipe can then be mapped onto distinct device commands. Additionally, textured surfaces can help identify situations where an object may be partially covering a surface used to generate a touch input, such as hair over an earbud.

In operation, textured surfaces can be incorporated into user device 102, a separate device associated with user device 102, or located on a surface independent from user device 102. When incorporated into user device 102 the textured surface can be applied to one or more active or inactive surfaces of the housing of user device 102. Active surfaces are often smooth to accommodate touch recognition technologies, such as surface acoustic wave technology, and as such inactive surfaces may be advantageous.

Figure 2:
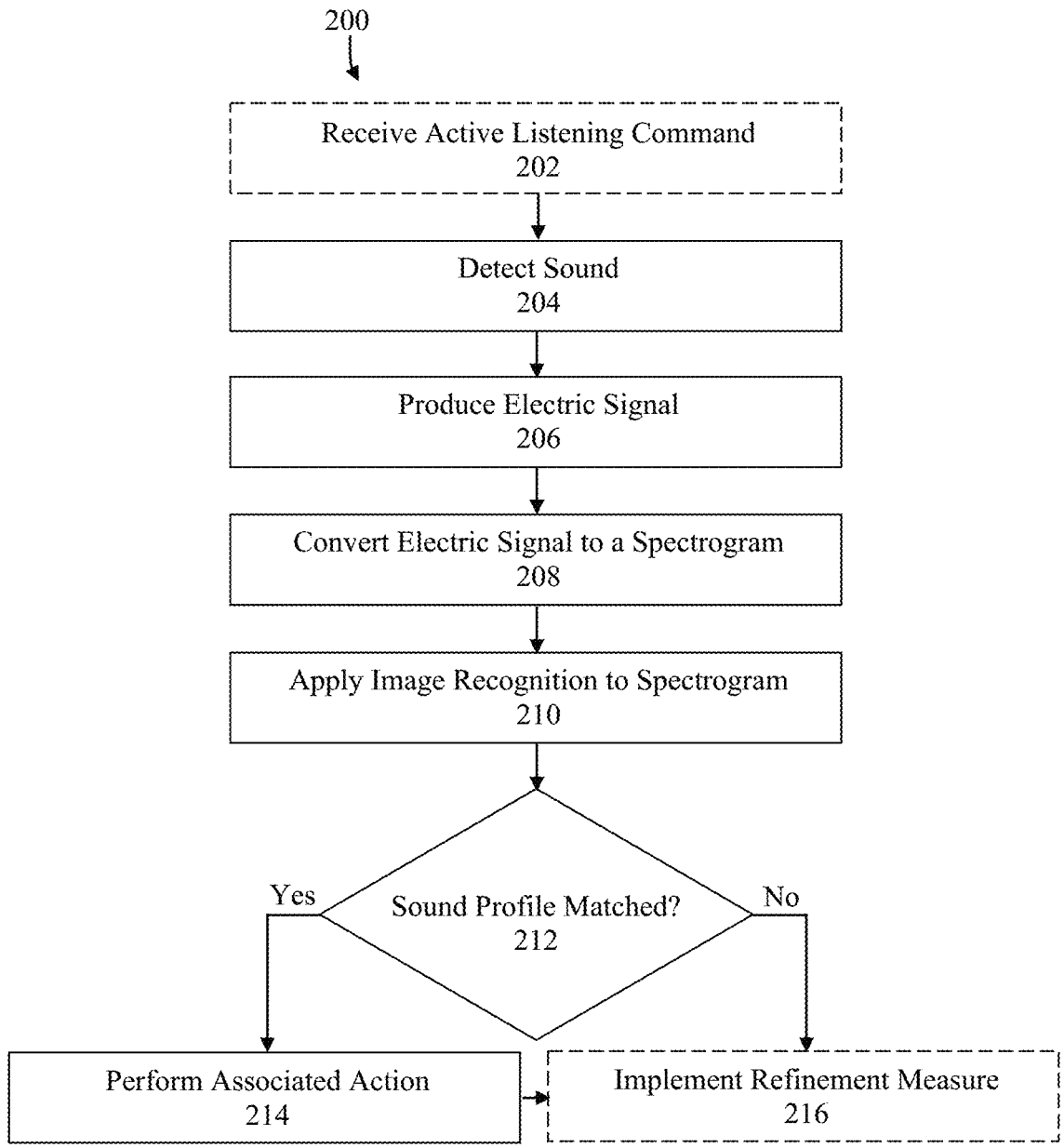
FIG. 2 is a flow chart of a method of touch input using sound, according to an embodiment.

Referring to FIG. 2, a method 200 for processing touch input using sound is depicted, according to an embodiment. Method 200 can be implemented through a user device such as user device 102.

At 202, an active listening command can optionally be received by the user device to prompt the user device to begin listening. The active listening command can be communicated through a UI of the user device or prompted by a distinct sound cue. For example, the user device may passively listen for a distinct sound cue, such as a spoken phrase, which can then prompt the user device to process following sounds for a sound profile associated with a touch input. Arrangements involving active listening commands can prolong battery life of the user device that may result from continually or periodically processing detected sounds. In some embodiments, a portion of a sound profile, such as a touchdown phase, can serve as an active listening command. In embodiments, any user interaction with a user device or a device associated with the user device, can serve as an active listening command. Once an active listening command has been received by the user device a prompt or alert can be communicated to the user to indicate an active listening period has begun. The durations of such active listening periods can be customized based on user preference or user device considerations.

At 204, sound is detected by a transducer of the user device. In embodiments, the period of sound detection can be shortened or lengthened based on known sound profiles. For example, if no sound profiles have a duration of 5 seconds the user device can stop listening after 5 seconds or after a period of time sufficient to account for user delay or error in beginning the touch input.

In embodiments that do not rely on active listening commands, at 204 the user device can passively listen for sounds. Sound isolation or interpretation techniques can enable the user device to selectively process detected sounds. For example, the user device can process only the sounds that are calculated to have been generated within a particular distance of the user device. Parameters that may be used to effectively serve as active listening commands can include volume of the sound, direction of the sound, estimated location of the sound, characteristics of the sound and the like. Sound characteristics can include indications of the surface from which a touch input may be made, such as particular materials (e.g., aluminum, glass, plastic).

A confirmation alert or ping can optionally be presented to a user upon detection of a sound profile to prevent unwanted device control according to embodiments. In such embodiments the user may then confirm the touch input through repetition of the original touch input, a touch input associated with a confirm operation, a speech command, or the like.

In some embodiments sound profiles can serve as command operations in real time. In one example a user may indicate a desire to change a device's volume level either by direct input, such as through a UI, or through a distinct touch input. This indication can then trigger the device to begin ongoing image recognition of detected sound, allowing a user to change the volume level with a prolonged touch input. In operation this may be realized by an "upward swipe" sound profile representing a command operation to increase volume and a "downward swipe" sound profile representing a command operation to decrease volume. Such real time analysis can facilitate acute control over device settings and user preferences. In embodiments, real-time sound analysis can be mimicked by frequent, periodic sampling of the touch input.

At 206, the transducer converts the detected sound into an electric signal that is transmitted to a sound processing engine. In embodiments, the sound processing engine can be the processor of the user device or exist external to the user device such as at a server communicatively coupled to the user device via a network.

At 208, the electric signal is converted by the sound processing engine into a spectrogram. In embodiments, the produced spectrogram can be processed to enhance distinguishable characteristics for sound profile matching or to remove excess time before or after a potential touch input. For example, transformations can be applied to certain sound tones or frequencies to simplify the comparison process with trained sound profiles or otherwise improve matching accuracy.

At 210, an image recognition MLA is applied to the produced spectrogram to determine if a sound profile is matched at 212. This comparison is enabled by the image recognition MLA being trained on data sets of sound profiles associated with touch inputs. In embodiments the MLA can be trained on supervised data such that training spectrograms are labeled with an associated touch input. Supervised data can improve the accuracy of comparisons by labeling visual characteristics that stem from similar user touches. For example, a sound profile associated with a user making two lateral "swipes" across an inactive surface may be distinct from a sound profile associated with a user making a "Z" pattern on the inactive surface; however, given both touch inputs share touch characteristics (i.e., two lateral swipes) image recognition between these two sound profiles could be inaccurate if a user fails to make consistent contact with the surface during the diagonal swipe in the "Z" formation. By labeling the training data for the MLA, associations between sound profiles that share touch input characteristics can be made to improve image recognition accuracy. Phases of touch inputs, such as touchdown, movement, and liftoff, can also be labeled for training data. Notably, over time the MLA can develop similar relationships between sound profiles using unsupervised data but such training may be less efficient.

At 214, a control operation of a user device is performed if a sound profile was detected. Sound profiles and the associated touch inputs can be mapped to different control operations for a user device. Control operations can be one or more of media control (e.g., play, pause, or skip), volume control, power control, and changing an operating mode of the user device. In embodiments the control operation can be for a user device separate from the device that detected the sound.

At 216, refinement measures can optionally be implemented to improve future handling of sound profile detection. Refinement measures can include one or more feedback loops to improve future sound profile recognition or personalization of the image recognition MLA to a user.

In embodiments, refinement measures can be based on the context of the detected sound. For example, if a produced spectrogram does not match a sound profile a temporary flag can be raised to indicate a recent failed match. In later iterations of method 200 if another sound is detected while the failed match flag is present, the required threshold for a sound profile to be considered a match to a sound profile can be altered. Such an arrangement can reduce user frustration in situations where the user is attempting, yet repeatedly failing, to produce a sufficiently identifiable touch input. In embodiments, one or more feedback loops can alter parameters of the image recognition MLA to personalize the sound profile matching experience for each user. Parameters can include one or more of: duration of the failed match flag per instance, intensity of the matching threshold change responsive to a failed match flag being raised, whether the matching threshold is changed universally or for only one or more sound profiles identified as being most similar to the prior failed attempt, and an alert or prompt to the user that the sound profile is not recognized. In some embodiments, the effects of failing to match a sound profile can be amplified across failed attempts or set to only activate once a certain number of failed attempts occur.

In embodiments, refinement measures can personalize sound profiles for users. For example, if a user consistently performs a certain touch input such that one or more visual characteristics are modified from the sound profile, the sound profile can be updated to reflect the difference in visual characteristics. This update process can be applied to all devices or be limited to one or more devices that detected the repeated discrepancies. Personalization can also be based on one or more user profiles. Implementation of the update can also vary across embodiments. The update can entirely replace the previous sound profile or simply expand the visual characteristics that are recognized as the sound profile. Thus, over time the MLA image recognition can be improved through refinement measures.

It should be understood that the individual operations used in the methods of the present teachings may be performed in any order and/or simultaneously, as long as the teaching remains operable. Furthermore, it should be understood that the apparatus and methods of the present teachings can include any number, or all, of the described embodiments, as long as the teaching remains operable.

As previously discussed, sound profiles (i.e., spectrograms associated with particular touch inputs) can be mapped to different device command operations. In operation, a user can be presented with a suite of known touch inputs and then map each touch input to distinct command operations based on preference.

In some embodiments, users can introduce custom sound profiles by providing samples of the desired touch input to user device 102. By creating a set of training data the user can generate robust custom sound profiles. If a particular user's custom sound profiles share significant similarities with other user's custom sound profiles, training sets can be aggregated. This aggregation is particularly advantageous in embodiments that track phases of a touch input as similar phases can be trained independently. By training the image recognition MLA based on phases a more robust training set can be developed due to only requiring similarities between each phase. Thus, custom sound profiles can be implemented without requiring a large training data set from one particular user.

In operation, separation of touch inputs into phases can improve lookup efficiency. By treating sound profiles as a combination of two or more phases, potential sound profile matches can be eliminated once an individual phase is found to be distinct by the image recognition MLA. This technique can improve efficiency by reducing the size of data being pulled from each lookup operation during the image recognition process. Such enhancements represent particular advantages over conventional image recognition techniques that are prohibitive for application with small devices, such as earbuds, due to greater computational resource requirements.

Figure 3A:
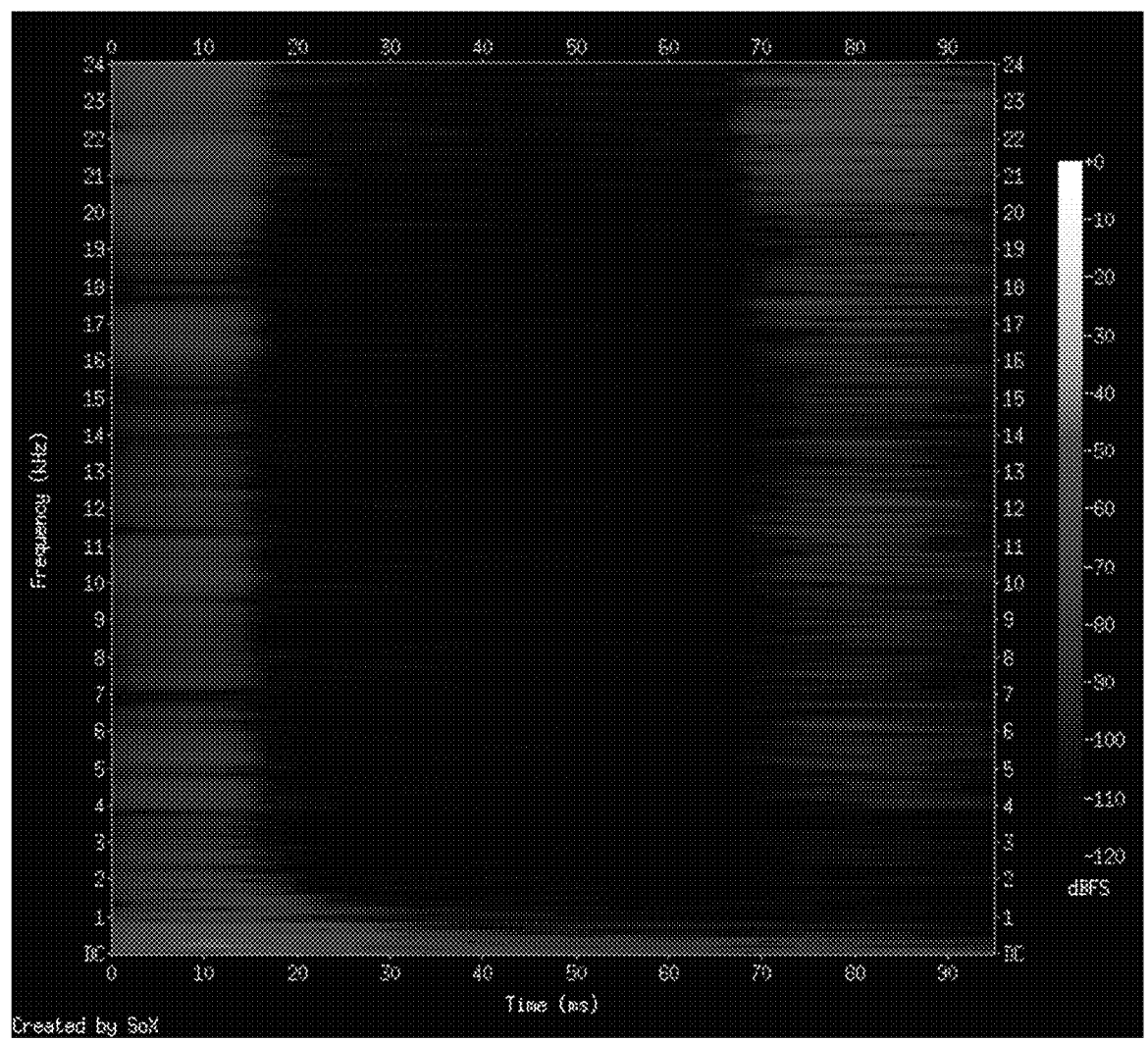
FIG. 3A is a spectrogram of a touch input for a "tap," according to an embodiment.
Figure 3B:
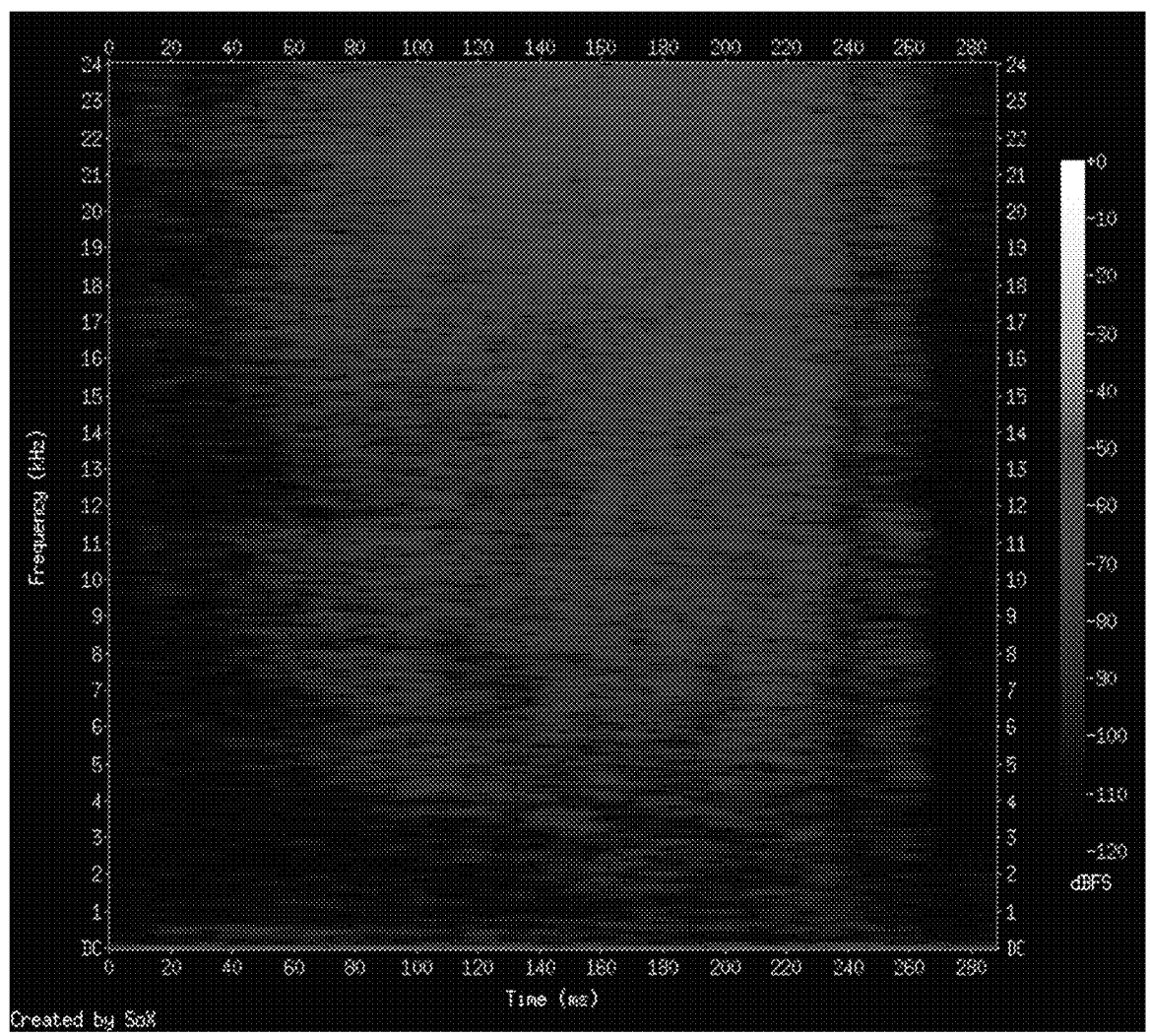
FIG. 3B is a spectrogram of a touch input for a "swipe," according to an embodiment.

FIGS. 3A-3B depict spectrograms of sound profiles. FIG. 3A is a spectrogram of a "tap" and FIG. 3B is a spectrogram of a "swipe" motion. As can be seen from the figures clear distinctions can be made by observing the frequency of sounds produced by touch inputs over time.

In embodiments, an array of transducers can be arranged such that detection of X-Y coordinates across a surface being touched is possible. Implementation of such an array can essentially provide a touchpad functionality as the position of a touch on a surface can be determined. In such embodiments, the position of touch input can be considered in determining sound profiles. For example, two taps in a single location can be distinguished from a tap in a first position followed by a tap in second position. Such delineation of sound profiles can allow more control operations to be mapped to touch inputs that are more distinct (and therefore more easily recognizable).

Figure 4:
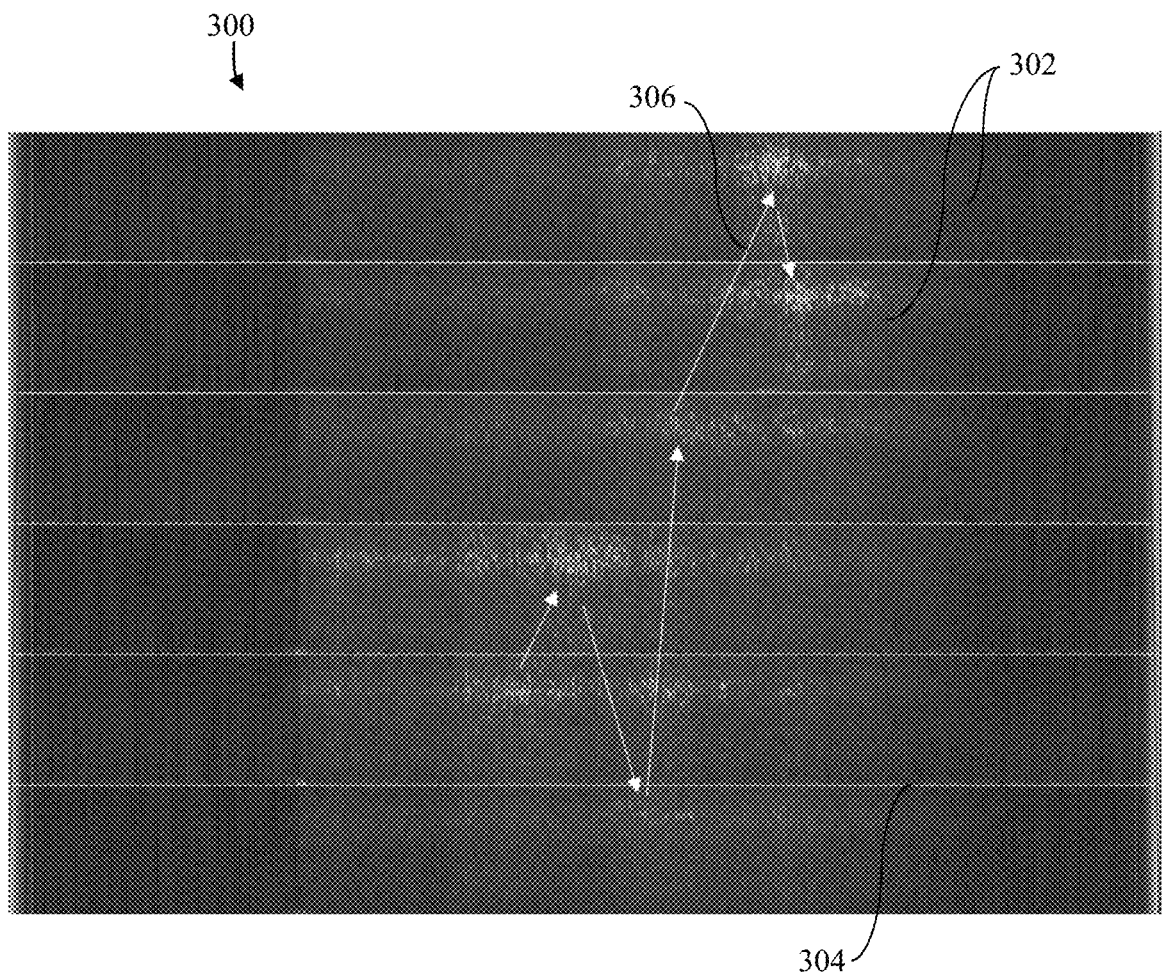
FIG. 4 is a plot including spectrograms of six concurrent microphone signals, according to an embodiment.

Referring to FIG. 4, a plot 300 of spectrograms 302 is depicted according to an embodiment. The plot depicts six spectrograms 302 each representing one of six concurrent microphone signals. The spectrograms are stacked vertically and separated by thin horizontal lines 304 for clarity. Over time (X axis) change in frequency (Y axis) can be recognized across the microphone array to detect a touch input that moves in a direction. Thus, X/Y coordinates can be extractable from the microphone array. In embodiments, arrows 306 can be transposed to emphasize extractable X/Y coordinates.

Embodiments of the present disclosure can expand user input functionality of existing devices without requiring hardware modifications. Implementation of sound profile recognition can be implemented by a software upgrade according to embodiments. Over time, additional functionality, such as more control operations, and improved sound profile recognition can further be packaged as updates. Accordingly, implementation of sound profile recognition can dramatically reduce production costs in comparison with input means that involve active surfaces or touch screens. Further, sound profile recognition of the present disclosure enables a user to control a device without seeing or manipulating the device itself.

Even devices that do not incorporate transducers or do not rely on transducers to detect sound can be controlled or manipulated using the disclosed method provided another device can detect sound. For example, a smartphone may be communicatively coupled to a speaker, such as by Bluetooth, and used to detect sound profiles that can correlate to control operations for the speaker.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A system for controlling a device, the system comprising:
   at least one microphone configured to:
      detect a sound produced from touching a surface; and
      produce an electrical signal from the detected sound; and
   at least one processor configured to:
      receive the electrical signal from the at least one microphone;
      convert the received electrical signal to a spectrogram;
      use image recognition to compare the spectrogram to one or more sound profile spectrograms; and
      in response to, based on the comparison, the spectrogram meeting or surpassing a similarity threshold to one of the one or more sound profile spectrograms, change at least one characteristic of the device based on a control operation mapped to the one of the one or more sound profile spectrograms.

2. The system of claim 1, wherein the at least one microphone is disposed in or proximate to the device, and wherein the device has an inactive housing.

3. The system of claim 2, wherein the at least one microphone comprises an array of microphones, and wherein the comparison is based in part on positions of the microphones of the array of microphones relative to the inactive housing.

4. The system of claim 1, wherein the surface is an inactive surface.

5. The system of claim 4, wherein the inactive surface is engraved, logoed, or textured, and wherein the comparison is based in part on the inactive surface.

6. The system of claim 1, wherein the at least one microphone is configured to detect the sound only upon receiving an active listening command.

7. The system of claim 1, wherein the spectrogram includes one or more visual characteristics associated with the detected sound.

8. The system of claim 1, wherein the comparison is based on one or more of a touchdown stage representing a user making contact with the surface during the touching of the surface, a movement stage representing the user continuing contact with the surface during the touching of the surface, and a liftoff stage representing the user ceasing contact with the surface during the touching of the surface.

9. The system of claim 1, wherein the one or more sound profile spectrograms are generated by a user of the device.

10. The system of claim 1, wherein the at least one microphone is further configured to update the one or more sound profile spectrograms to include the spectrogram.

11. The system of claim 1, wherein the comparison is based in part on whether a preceding spectrogram from a previous detected sound failed to meet or surpasses the similarity threshold to all of the one or more sound profile spectrograms.

12. A method for controlling operation a device, the method comprising:
    detecting, with one or more microphones, a sound produced from touching a surface;
    producing an electrical signal from the detected sound;
    transmitting the electrical signal to a processor;
    converting, at the processor, the received electrical signal to a spectrogram;
    using image recognition to compare the spectrogram to one or more sound profile spectrograms; and
    in response to, based on the comparison, the spectrogram meeting or surpassing a similarity threshold to one of the one or more sound profile spectrograms, changing at least one characteristic of the device based on a control operation mapped to the one of the one or more sound profile spectrograms.

13. The method of claim 12, wherein the surface is an inactive housing of the device.

14. The method of claim 13, wherein the comparing is based in part on a type of the device.

15. The method of claim 13, wherein the surface is an exterior face of the inactive housing, wherein the surface is engraved, logoed, or textured, and wherein the comparing is based in part on the surface.

16. The method of claim 12, further comprising receiving an active listening command prior to detecting the sound.

17. The method of claim 12, wherein the spectrogram includes one or more visual characteristics associated with the detected sound.

18. The method of claim 12, wherein the comparing is based on one or more of a touchdown stage representing a user making contact with the surface during the touching of the surface, a movement stage representing the user continuing contact with the surface during the touching of the surface, and a liftoff stage representing the user ceasing contact with the surface during the touching of the surface.

19. The method of claim 12, further comprising updating the one or more sound profile spectrograms to include the spectrogram.

20. The method of claim 19, wherein the comparing is based in part on whether a preceding spectrogram from a previous detected sound failed to meet or surpass the similarity threshold to all of the one or more sound profile spectrograms.

* * * * *